United States Patent
Yates et al.

(10) Patent No.: US 12,372,166 B2
(45) Date of Patent: Jul. 29, 2025

(54) USING DIVERGET FLOW PATHS IN VALVE TRIM TO ABATE VALVE NOISE

(71) Applicant: Dresser, LLC, Houston, TX (US)

(72) Inventors: Chad Eric Yates, Houston, TX (US); Donald Stroman Sanders, Atlanta, GA (US); Stephen Randall Farmer, Orange Park, FL (US); Jeremy Asher Glaun, Sharon, MA (US); Rohan N. Buntval, Houston, TX (US)

(73) Assignee: Dresser, LLC, Houston, TX (US)

( * ) Notice: Subject to any disclaimer, the term of this patent is extended or adjusted under 35 U.S.C. 154(b) by 68 days.

(21) Appl. No.: 18/085,653

(22) Filed: Dec. 21, 2022

(65) Prior Publication Data

US 2024/0209959 A1 Jun. 27, 2024

(51) Int. Cl.
*F16K 47/04* (2006.01)

(52) U.S. Cl.
CPC ........ *F16K 47/04* (2013.01); *F16K 2200/502* (2021.08)

(58) Field of Classification Search
CPC .... F16K 47/04; F16K 47/12; F16K 2200/502; Y10T 137/87539
USPC ..................... 251/118, 126, 127; 137/601.18
See application file for complete search history.

(56) References Cited

U.S. PATENT DOCUMENTS

| | | |
|---|---|---|
| 3,537,513 A | 2/1968 | Matthews et al. |
| 3,780,767 A * | 12/1973 | Borg ........................ F16K 47/08 137/625.37 |
| 3,813,079 A * | 5/1974 | Baumann ................. F16K 47/08 251/282 |
| 3,990,475 A * | 11/1976 | Myers ..................... F16K 47/04 137/625.3 |
| 4,106,525 A * | 8/1978 | Currie ............... F16L 55/02772 138/44 |
| 4,249,574 A * | 2/1981 | Schnall ..................... F15C 1/02 137/625.37 |
| 4,384,592 A | 5/1983 | Ng |

(Continued)

FOREIGN PATENT DOCUMENTS

WO 2009094077 A1 7/2009

*Primary Examiner* — Matthew W Jellett
(74) *Attorney, Agent, or Firm* — Paul Frank + Collins P.C.

(57) ABSTRACT

A valve trim that is configured to abate noise in a control valve. These configurations may include a cage with a flow path that has interior and exterior openings. The cage may also have a bore to receive a closure member or "plug." This plug can travel longitudinally to change parameters of flow through the control valve. In one implementation, the exhausts of flow paths with adjacent inlets are offset or spaced from another. In one implementation, the exterior openings vertically offset. However, other designs may adopt combinations of radial, helical, or angular offsets as well. This feature can prevent mixing of flow from jets that are in the same inlet plane. This feature, in turn, can reduce jet-to-jet interactions that may abate noise. Use of additive manufacturing may be useful (or even necessary) to create these parts within certain design envelopes because these techniques can create the unique flow geometry within a unitary or monolithic body. In this way, the valve trim of the present disclosure can maintain, or even reduce, costs of the control valve, while at the same time it can simply the overall construction of the valve device.

16 Claims, 6 Drawing Sheets

(56) References Cited

U.S. PATENT DOCUMENTS

| | | | | |
|---|---|---|---|---|
| 4,567,915 A * | 2/1986 | Bates | .................... | F16K 47/08 |
| | | | | 138/40 |
| 4,705,071 A * | 11/1987 | Connors, Jr. | ........... | F16K 47/08 |
| | | | | 376/463 |
| 4,766,932 A * | 8/1988 | Heymann | ............... | F16K 47/08 |
| | | | | 251/282 |
| 5,018,703 A * | 5/1991 | Goode | .................... | F16K 47/08 |
| | | | | 251/118 |
| 5,575,618 A * | 11/1996 | Brandon | ................ | F01D 25/00 |
| | | | | 55/467 |
| 5,687,763 A | 11/1997 | Steinke | | |
| 6,505,646 B1 * | 1/2003 | Singleton | ................ | F16K 47/08 |
| | | | | 137/625.33 |
| 6,951,295 B1 | 10/2005 | Gaus et al. | | |
| 7,802,592 B2 * | 9/2010 | McCarty | ................ | F16K 47/08 |
| | | | | 137/625.3 |
| 8,826,938 B2 | 9/2014 | Moore | | |
| 9,587,764 B2 * | 3/2017 | Juhnke | ..................... | F16K 3/24 |
| 10,697,561 B2 * | 6/2020 | McCarty | ................ | F16K 47/04 |
| 10,711,937 B2 * | 7/2020 | Gabriel | ............. | F16L 55/02772 |
| 2005/0199298 A1 | 9/2005 | Farrington | | |
| 2005/0252559 A1 | 11/2005 | McCarty et al. | | |
| 2009/0183790 A1 | 7/2009 | Moore | | |
| 2016/0123477 A1 | 5/2016 | Eilers et al. | | |
| 2018/0340630 A1 | 11/2018 | Mccarty et al. | | |

\* cited by examiner

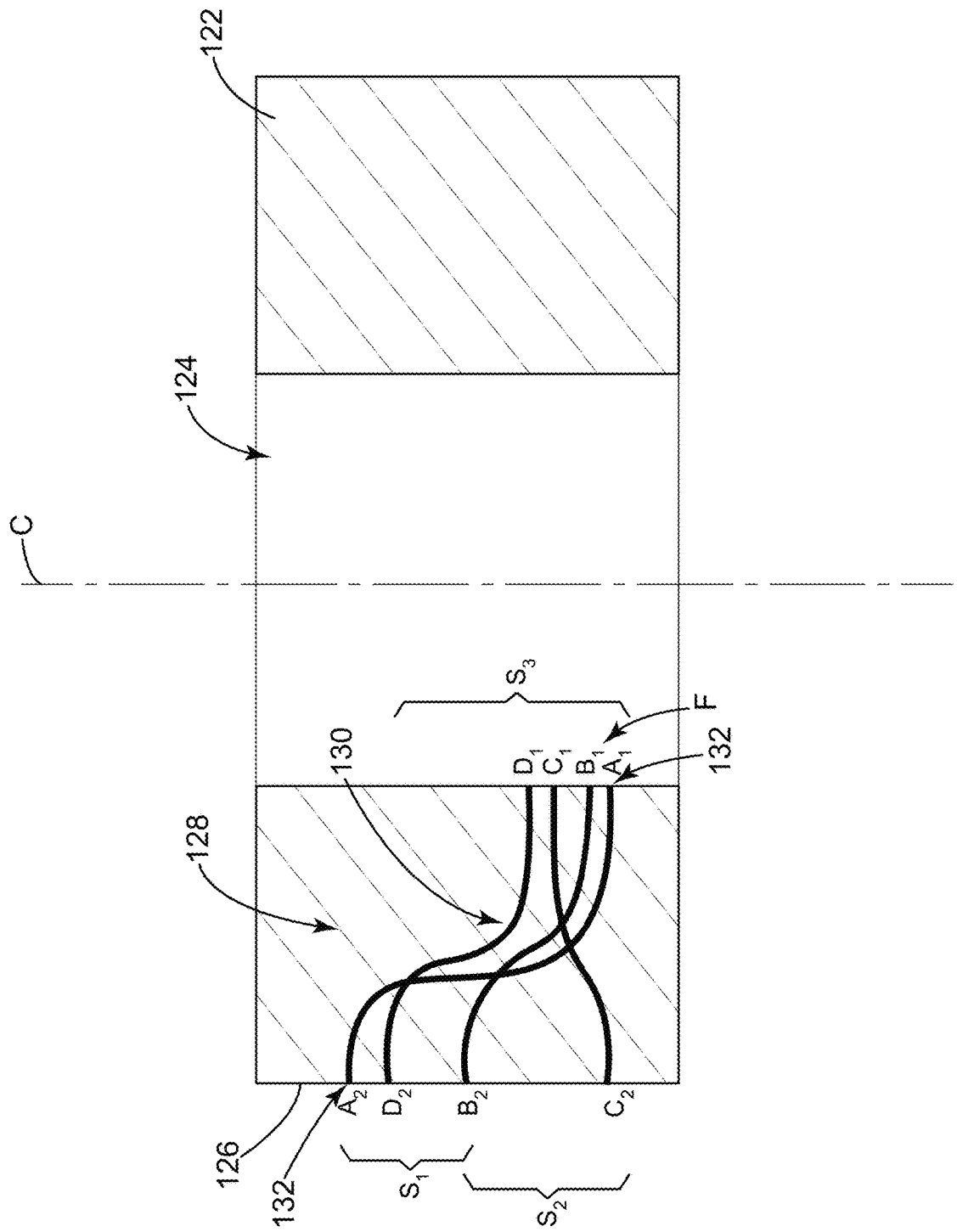

USING DIVERGET FLOW PATHS IN VALVE TRIM TO ABATE VALVE NOISE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. It is common in these facilitates for flow controls, like control valves, to generate significant noise in service because of changes in pressure that occur as the flow transits across the device. This aerodynamic noise can reach well above 100 dba or, at least, exceed set limits that are necessary to provide a safe working environment for technicians and other workers at the facility.

SUMMARY

The subject matter of this disclosure relates to improvements to valve manufacture or construction that can attenuate this noise to safe, acceptable levels. Of particular interests are embodiments that separate outlets of flow paths that have inlets in adjacent inlet planes. This feature may reduce the effect of jet-to-jet interaction at the outlets without increasing dimensions of the underlying component structure. As an added benefit, the multiple flow paths force pressure drop to occur gradually within the valve device. This feature can maintain velocity of fluid at levels that are reasonable, but at noise levels that are well-within specifications or standards.

DRAWINGS

This specification refers to the following drawings:

FIGS. 2 and 2A depict an elevation view of a cross-section and a plan view from the top of the cross-section, respectively, of an example of the valve trim of FIG. 1;

Figure 1:
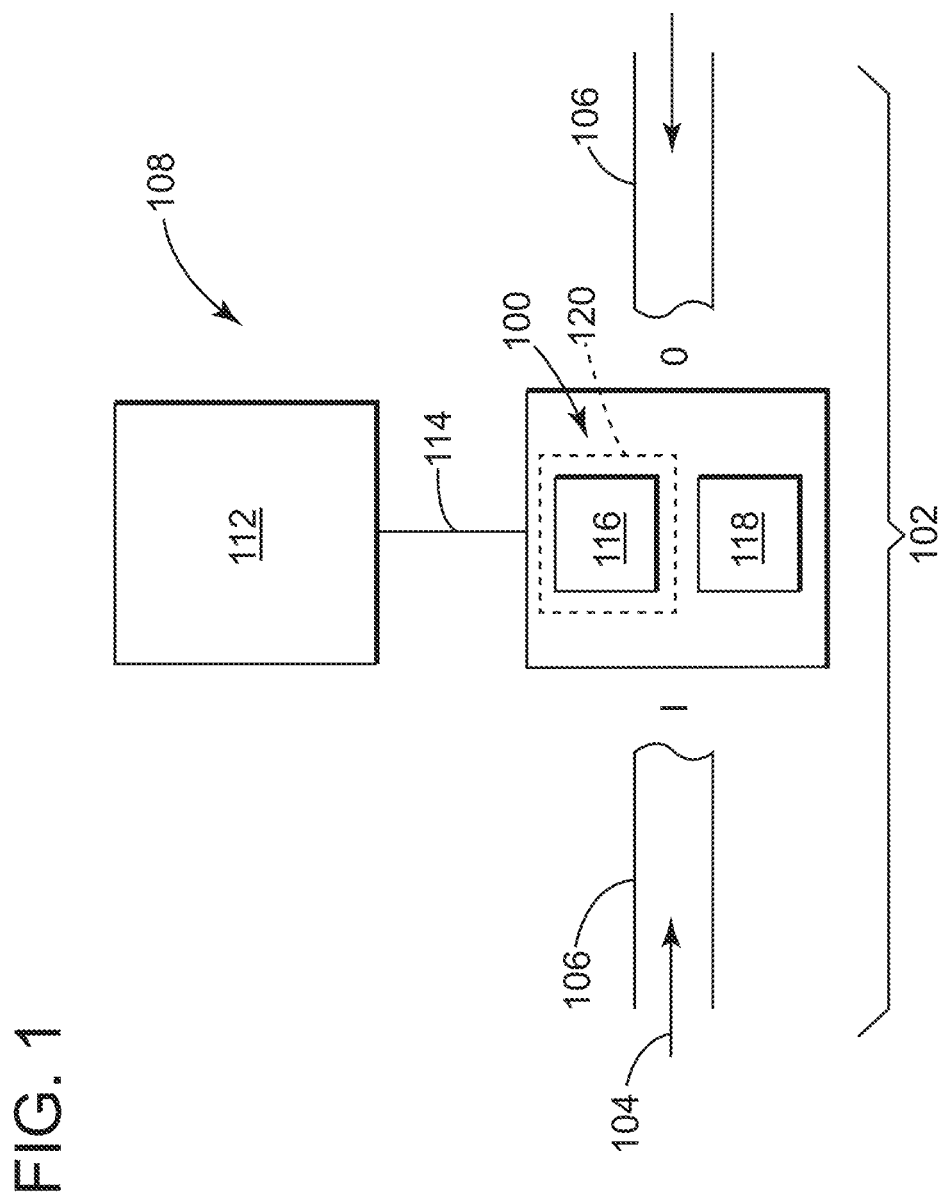
FIG. 1 depicts a schematic diagram of an exemplary embodiment of a valve trim.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These examples aim to abate noise in industrial or commercial valves. This noise is cause for concern because, left unmitigated, it can create unsafe or even hazardous work areas for operators or technicians. The designs proposed herein may implement tortuous pathways to quiet valves in the field. These pathways maximize the percentage of total pressure drop that shearing action and boundary layer turbulence induce in flowing fluids. Other embodiments are within the scope of this disclosure.

FIG. 1 depicts an example of a valve trim 100. This example is found in a distribution network 102, typically designed to carry material 104 through a network of conduit 106. The valve trim 100 may be part of a flow control 108 that has a valve body 110 to connect in-line with the conduit 106. The device may also have actuator 112. A valve stem 114 may extend from the actuator 112 to locate a closure member 116 in position proximate a seat 118. In one implementation, the valve trim 100 may include a cage 120 that receives the closure member 116 therein.

Broadly, the valve trim 100 may be configured to attenuate noise. These configurations may incorporate parts that can address sources of noise in the device. These parts may, for example, have structure that changes direction of flow, often as the flow moves radially through the part from inside to outside. As noted, this structure takes advantage. This feature can improve or increase pressure-drop because it provides greater flow path density within existing dimensions for the part.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at openings I, O. Adjacent pipes 106 may connect to these flanges. The actuator 112 may use compressed or pressurized air and, along with a piston, spring (or springs), or a flexible diaphragm, generate a load. The valve stem 114 may form an elongate cylinder or rod that directs this load to the closure member 116, which is often a cylindrical block or plug. The load can manage position of this plug within the valve trim 100 to regulate flow of material 104 through an opening in the seat 118. The position of the plug may expose certain parts of the valve trim 100 to flow, for example, to allow flow to the outlet O. However, due to its dimensions or other considerations, the plug may not expose other parts of the valve trim 100 to flow at all.

The cage 120 may be configured to reside in proximity to the seat 118. These configurations may include designs that are "porous" or allow material to flow from inside to outside of the device. This feature may facilitate pressure drop because of paths that direct fluid in various directions within material of the cage 120. These paths mitigate or attenuate noise. As noted, the paths may have openings that are vertically offset from one another when the cage 120 is in position in the valve body 110. This arrangement can take advantage of the "full" surface area of the cage 120 because the openings may reside in the areas that the plug does not typically expose to flow.

FIG. 2 depicts an elevation view for a cross-section of exemplary structure for the cage 120. This structure may embody a cylinder 122 that has a body having a bore 124 with a center axis C. The body may also have an outer surface 126. A flow structure 128 may populate the body. Configurations of the flow structure 128 may pass a flow F of material 104 through one or more tortuous or winding paths. These paths may include a flow pathway 130 that extends through the body and, for example, terminates at openings 132, one each found at the bore 124 and the outer surface 126. The flow pathway 130 may have a cross-section that is round; however other cross-sections, like square or rectangular, may prevail as well. Its surface may be textured, for example, with bumps or stippling. This texture may be configured to add friction or drag to flow F. Along its length, the flow pathway 130 may assume geometry with a design or layout that dissipates pressure of flow F. This design may elongate or maximize travel of material 104 through the body. This feature can induce a pressure drop to reduce noise, for example, as flow F exits the cylinder 122 at the opening 132 on the outer surface 126.

Figure 2A:
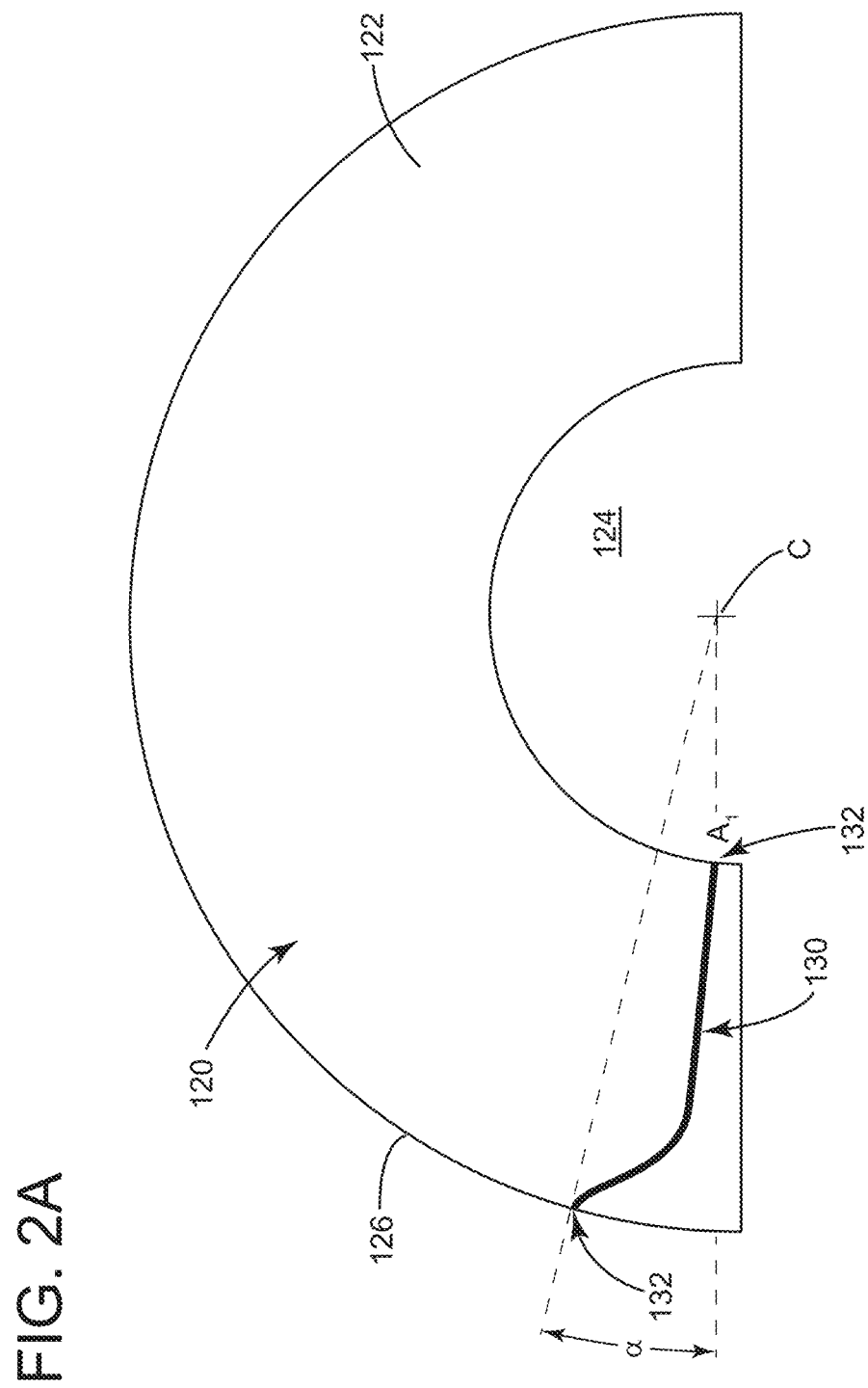

One design may separate the outlets of the flow pathways 130 that have adjacent inlets. This example includes a group of individual flow pathways 130, identified generally by the letters A, B, C, D, each terminating at interior (or "inlet") openings A1, B1, C1, D1 and exterior (or "outlet") openings A2, B2, C2, D2 respectively. The interior openings A1, B1, C1, D1 arranged in vertically adjacent planes. In one implementation, the flow pathways 130 that connect the openings 132 may adopt geometry that tortuously "winds" through the body of the cylinder 122. This tortuous geometry may create axial flow (i.e., along the axis C) as well as angular, radial, or helical flow within the body of the cylinder 122. It may also offset the outlet openings 132 of the flow pathway A and B, B and C, and C and D from one another. The offset or spacing S may prevent mixing of fluid F that exhausts from the device. For example, as shown in FIG. 2A, in addition to the vertical offset noted herein, a radial offset β may define a degree or an amount of offset or "radial asymmetry" that the design adopts between the interior openings A1, B1, C1 and the exterior openings A2, B2, C2 about the central axis C.

The complexities of the tortuous design and offset spacing S may cause asymmetry in the design. This asymmetry may lend itself to use of additive manufacturing techniques, like 3-D printing, because of any complex curves, bends, or other features in the tortuous geometry that is not amendable to traditional machining technology. These techniques may help to manufacture or embed the tortuous pathways 130 or other complex geometry in the body of the cylinder 122, particularly so that the body of the cylinder 122 becomes a unitary or monolithic structure or device. In other implementations, individual "plates" may stack on top of one another. This collective stack can form the body of the cylinder 122. However, this disclosure recognizes that use of additive techniques can avoid the need to stack "plates," and thus offers a better solution because it costs less, is less complex, or provides other benefits over the stacked plate design.

Figure 3:
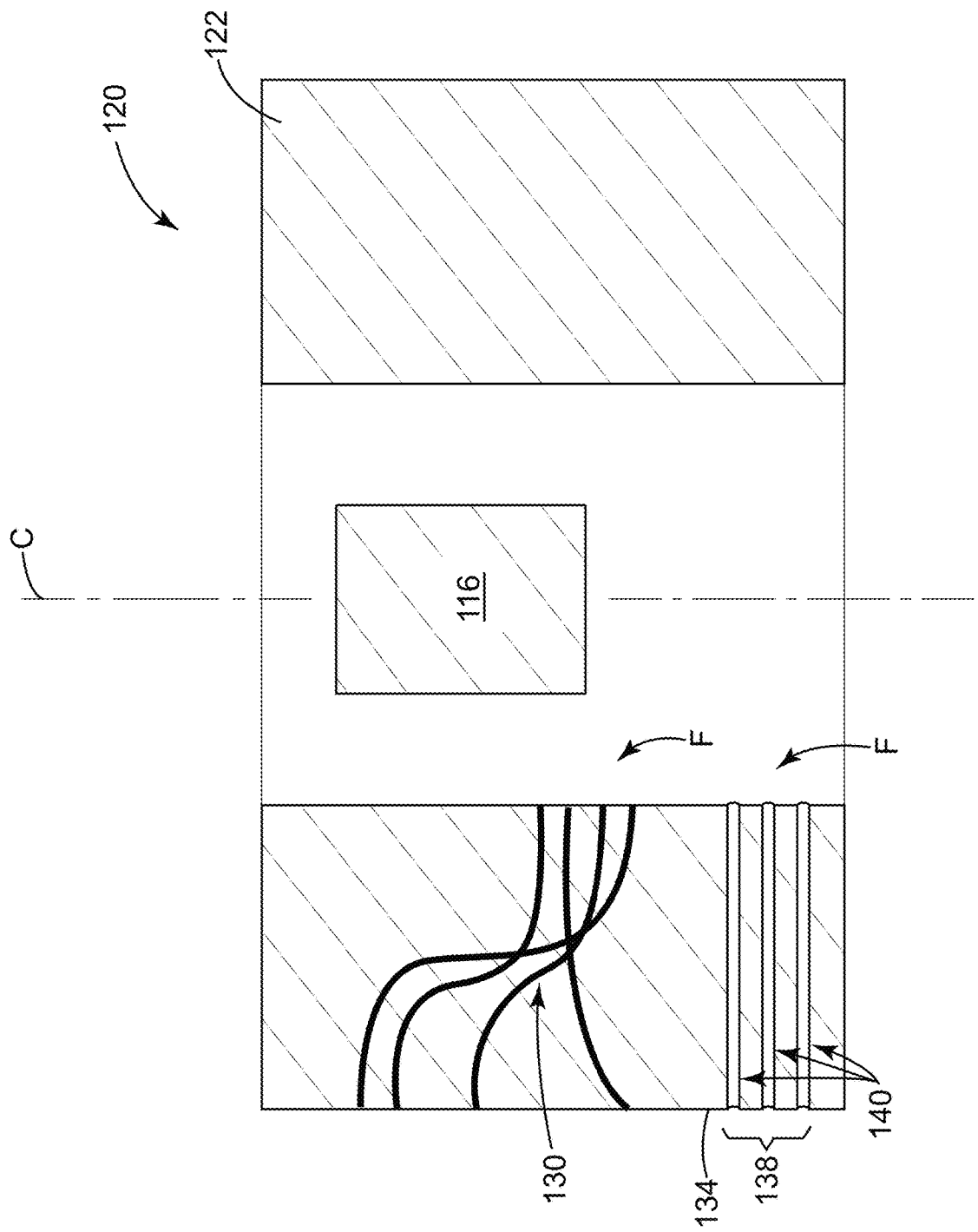
FIG. 3 depicts an elevation view of a cross-section of an example of the valve trim of FIG. 1.
Figure 4:
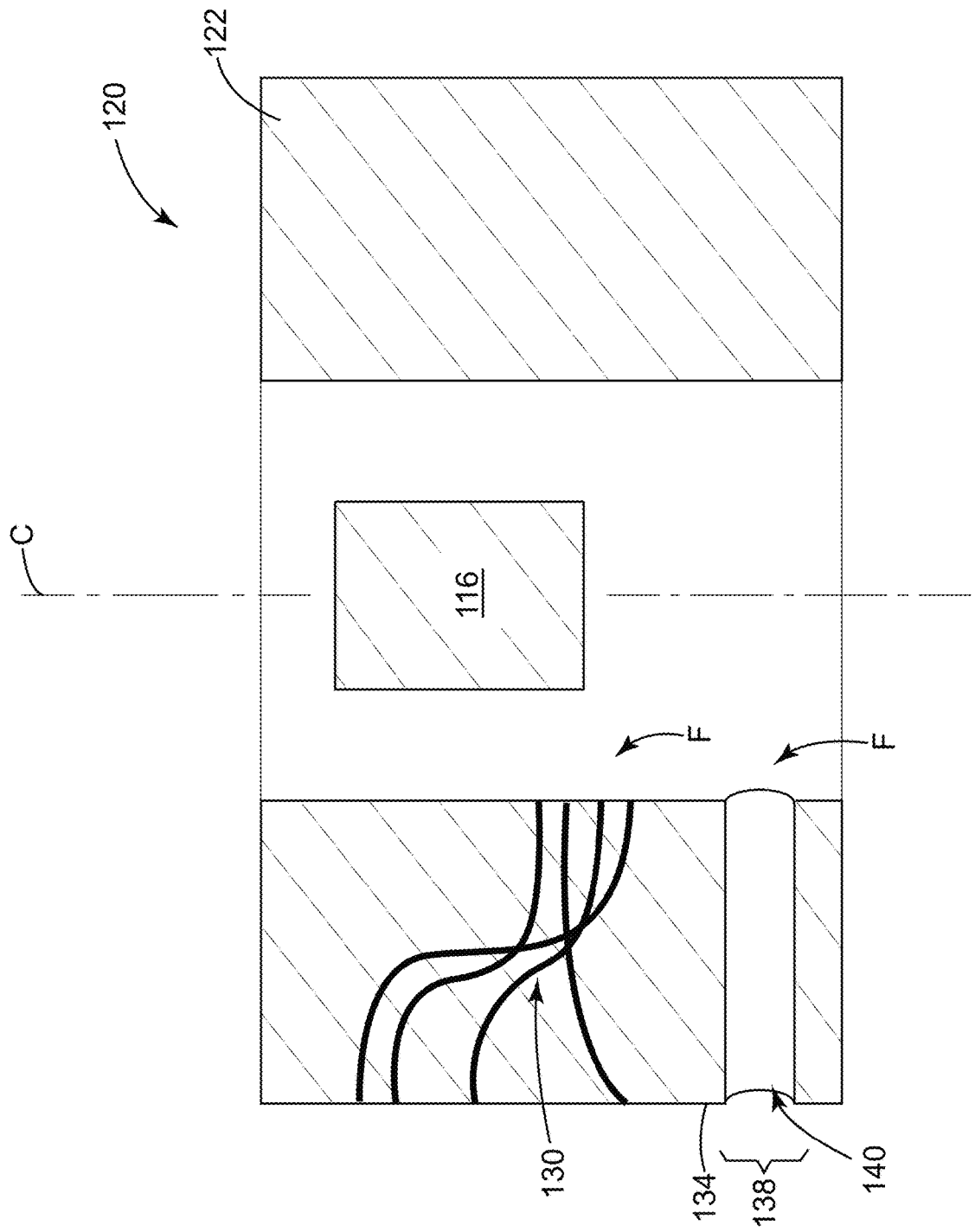
FIG. 4 depicts an elevation view of a cross-section of an example of the valve trim of FIG. 1.

FIGS. 3 and 4 depict elevation views for a cross-section of exemplary structure for the cage 120. Additional flow pathways 138 may also populate the cylinder 122. In FIG. 3, the flow pathways 138 may embody through-holes 140 that direct flow essentially radially from the interior of the device. The through-holes may perforate the lower section 134 in any number or arrangement as desired. As best shown in FIG. 4, the pathways 138 may embody a large-diameter through-hole 142.

Figure 5:
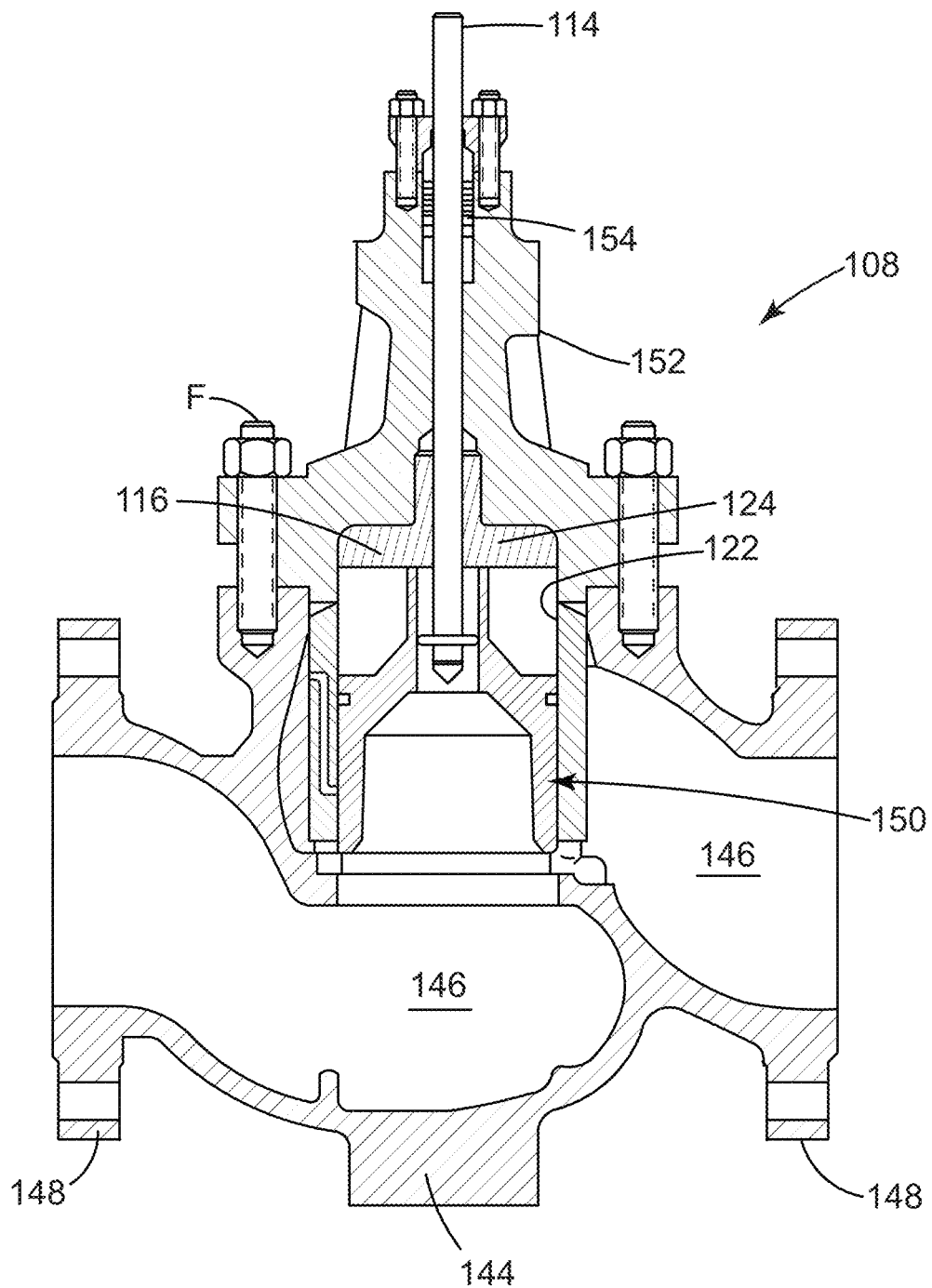
FIG. 5 depicts an elevation view of exemplary structure of a flow control.

FIG. 5 depicts an elevation view from the side showing exemplary structure for the trim 100. The cylinder 122 may reside in a casing 144 made of metal (or material with suitable properties). The casing 144 may have flow paths 146 that terminate at flanged openings 148. The flow paths 146 may receive material 104 from adjacent conduit 106 that attach to the casing at the flanged openings 148. The closure member 116 may embody a moveable plug 150 that resides in bore 124 of the cylinder 122. The valve body 110 may include a bonnet 152 that secures onto the casing 144. Fasteners F, like nuts and bolts, may work for this purpose. The valve stem 114 may extend through the bonnet 152. In one implementation, packing 154 may fit over the valve stem 114. The packing 154 is useful to allow movement of the valve stem 114, but prevent the flow control 108 from emitting fugitive emissions.

In view of the foregoing, the improvements may optimize use of surface area for noise abatement in valves or flow controls, generally. The design can maximize flow through the cage wall because of the additional flow pathways that are available to direct flow from inside to outside of the cage. Additive manufacturing may provide certain flexibility to accomplish the complexity of the layout.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
   a closure member; and
   a cage surrounding at least part of the closure member, the cage comprising a bore with an axis, the cage incorporating flow pathways, each terminating at,
      an inlet found on an inside surface of the bore, and
      an outlet found on an outside surface of the cage and vertically above the inlet,
   wherein, for each of the flow pathways, the outlet is radially offset from the inlet, and
   wherein, for flow pathways that have adjacent inlets, the outlets are separated vertically from one another by an offset spacing that is larger than the offset spacing between the adjacent inlets to prevent mixing of fluid in proximity to the outlets.

2. The valve of claim 1, wherein for flow pathways that have adjacent inlets, the outlets are radially separated from one another.

3. The valve of claim 1, wherein, for flow pathways that have adjacent inlets, the outlets are angularly separated from one another.

4. The valve of claim 1, wherein, for each of the flow pathways, the outlet is angularly offset from the inlet on each flow pathway.

5. The valve of claim 1, wherein the flow pathways are configured to direct flow through the cage in an axial and radial direction relative to the axis of the bore.

6. The valve of claim 1, wherein the flow pathways adopt a tortuous geometry.

7. The valve of claim 1, further comprising:
a through-hole in the cage having an axis perpendicular to the axis of the bore.

8. The valve of claim 1, further comprising:
a through-hole in the cage having an axis perpendicular to the axis of the bore and having a diameter that is larger than the diameter of the opening on the inside of the bore.

9. The valve of claim 1, further comprising:
a plurality of through-holes in the cage, each having an axis perpendicular to the axis of the bore.

10. A valve, comprising:
a cage with a bore;
a closure member moveable in the bore; and
a seat that is stationary relative to the cage,
wherein the cage comprises a body that is configured with a pair of outlets connected to and vertically above a pair of inlets found inside of the bore that are adjacent to one another,
wherein the pair of outlets are spaced apart from one another to prevent mixing of fluid in proximity to the pair of outlets,
wherein the pair of outlets are separated vertically from one another by an offset spacing that is larger than the offset spacing between the adjacent pair of inlets to prevent mixing of fluid in proximity to the outlets, and
wherein, the pair of outlets are radially offset from the pair of inlets.

11. The valve of claim 10, wherein the pair of outlets reside in different planes that are perpendicular to the bore.

12. The valve of claim 10, wherein the pair of outlets reside in different planes that are perpendicular to the bore and are radially offset from one another.

13. The valve of claim 10, wherein the pair of outlets reside in different planes that are perpendicular to the bore and are angularly offset from one another.

14. A valve, comprising:
valve trim with a first outlet and a second outlet that are arranged to prevent mixing of individual streams of fluid in proximity to the first outlet and the second outlet; and
a closure member that resides in the valve trim,
wherein the first outlet and the second outlet connect to and are vertically above a first inlet and a second inlet, respectively, that are in proximity to the closure member and are adjacent to one another,
wherein the first outlet and the second outlet are separated vertically from one another by an offset spacing that is larger than the offset spacing between the first inlet and the second inlet to prevent mixing of fluid in proximity to the first outlet and the second outlet, and
wherein, the first outlet and the second outlet are radially offset from the first inlet and the second inlet, respectively.

15. The valve of claim 14, wherein a third outlet is disposed between the first outlet and the second outlet.

16. The valve of claim 14, wherein a third outlet connects to a third inlet that is adjacent to the second inlet, and wherein the third outlet is disposed between the first outlet and the second outlet.

* * * * *